United States Patent [19]

Stewart

[11] 3,900,628

[45] Aug. 19, 1975

[54] PRETENSIONED SCREEN PANEL

[75] Inventor: William E. Stewart, Somers, Conn.

[73] Assignee: Linatex Corporation of America, Stafford Springs, Conn.

[22] Filed: June 13, 1973

[21] Appl. No.: 369,496

[52] U.S. Cl. ............... 428/134; 209/397; 209/399; 428/217; 428/409; 428/492; 498/521
[51] Int. Cl............................. B07b 1/46; B32b 3/10
[58] Field of Search .......... 161/112, 109, 164, 166, 161/239, 255, 256; 209/403, 397, 399

[56] References Cited
UNITED STATES PATENTS

| | | | |
|---|---|---|---|
| 1,861,663 | 6/1932 | Lahey................................. | 161/112 |
| 2,054,274 | 9/1936 | Sullivan ........................ | 161/112 X |
| 3,018,891 | 1/1962 | Bergstrom....................... | 161/112 X |
| 3,133,853 | 5/1964 | Knox................................. | 161/190 X |
| 3,483,976 | 12/1969 | William........................... | 209/399 X |
| 3,594,262 | 5/1963 | Magidson........................ | 161/112 X |
| 3,684,091 | 8/1972 | Wehner .............................. | 209/403 |
| 3,811,570 | 5/1974 | Holding et al. ...................... | 209/399 |
| 3,833,120 | 9/1974 | Ogata................................. | 209/399 |
| 3,843,476 | 10/1974 | Kramer............................ | 161/109 X |
| 3,843,476 | 10/1974 | Kramer.............................. | 161/112 |

FOREIGN PATENTS OR APPLICATIONS 1,912,870   10/1969   Germany ........................ 209/397 X Primary Examiner—Harold Ansher
Attorney, Agent, or Firm—Prutzman, Hayes, Kalb & Chilton

[57] ABSTRACT

A laminated flexible screen panel useful in a vibratory screening operation consists essentially of a substantially planar laminated sheet structure comprised of a flexible, non-metallic backing layer and a relatively soft, abrasion resistant, elastomeric facing layer superimposed on and permanently bonded to the backing layer throughout its planar extent. The elastomeric layer has a substantially planar top wear surface while the backing layer is comprised of a high tensile strength, non-extensible, multi-ply pretensioned fabric having sufficient dimensional stability to resist extensive sagging and fluttering when subject to vibratory screening action.

8 Claims, 3 Drawing Figures

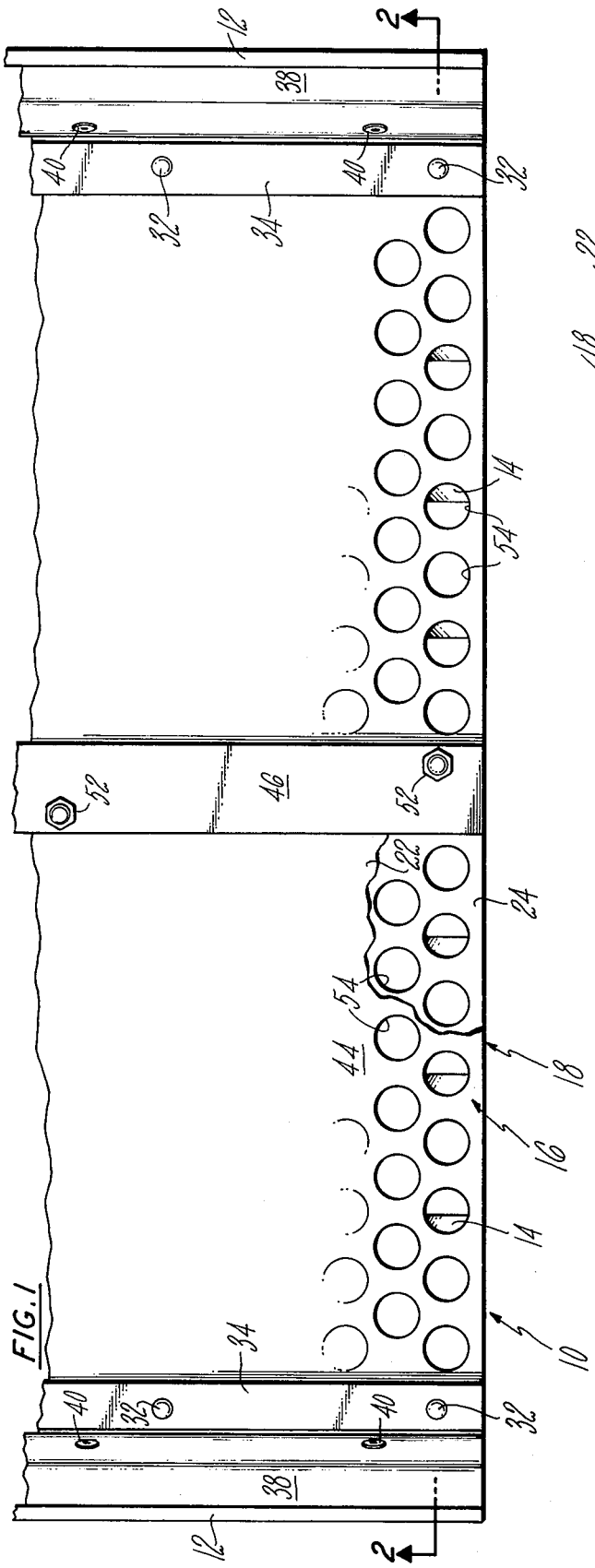
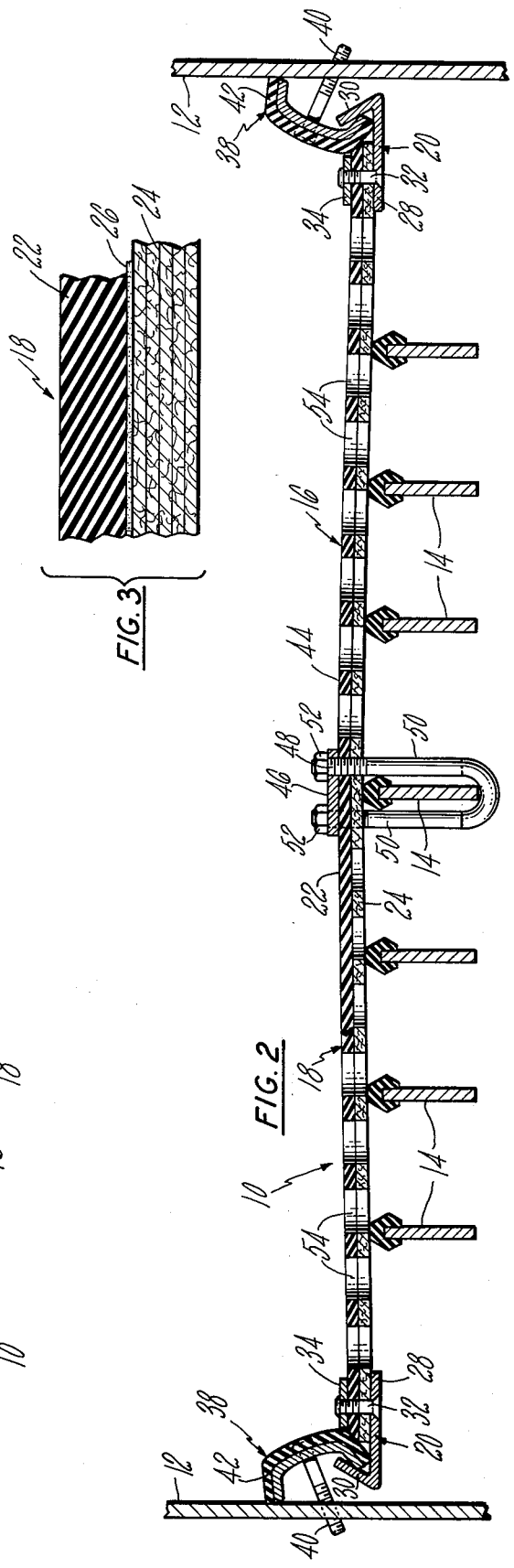

PRETENSIONED SCREEN PANEL

BACKGROUND AND SUMMARY OF THE INVENTION

The present invention relates generally to a screening panel ideally suited for scalping, sizing, classifying, separating, rinsing and dewatering granular materials such as mineral aggregates, crushed ore, coal, gravel and the like. More particularly, it is concerned with a new and improved screen of the type described that is of tough, laminated, dimensionally stable construction having a durable abrasion resistant, elastomeric wearing surface.

In recent years composite screen structures having a surface layer of rubber bonded or vulcanized to a metal plate have been used with increasing frequency as replacements for wire cloths and plates in scalping, classifying and rinsing granular materials. The composite screens exhibit the advantageous features of substantially prolonged useful life coupled with reduced plugging and blinding of the screen. However, the solid metal plate used as the base or support in the composite structure is disadvantageously heavy and inflexible and is subject not only to corrosive attack but also to metal fatigue due to the constant vibratory forces acting on the screen during its continuous operation. Such composite steel and rubber screens also tend to plug and blind when there are a large number of particles of a size near to the size of the screen openings. The plugging results from wedging of "near size" particles in the inflexible steel substrate after they have passed through the rubber layer.

In order to avoid the disadvantageous features associated with heavy metal support plates, all-rubber screens have been developed and employed in recent years. These are either one piece rubber screens or composite rubber members wherein the metal base or support is replaced with a hard rubber sheet. Although these all-rubber screens are of lighter weight, are readily resistant to corrosion and obviate the fatigue problem associated with the metal supported rubber screens, they exhibit substantial sagging and fluttering during use and are extremely difficult, if not impossible, to tension properly. Additionally, they required extensive modification of the screen support frame and even after proper tensioning lack sufficient dimensional stability. As a result, the openings within the screens quickly became distorted in both size and shape and the screens exhibit excessive wear on their bottom surface from the abrasive action of their fluttering on the screen support frame, thus shortening their useful life. Unfortunately, attempts to stabilize the all-rubber screens by making them thicker has disadvantageously hindered efficient screening due to the increased incidence of near sized particles becoming wedged as they attempted to pass through the extremely thick screen openings.

Accordingly, it is an object of the present invention to provide a new and improved elastomeric screening media that avoids the aforementioned problems yet is particularly well suited for scalping, sizing, classifying, separating, rinsing and dewatering operations. This new screening media retains the advantageous features associated with each of the rubber clad metal and all-rubber screen structures utilized heretofore while obviating substantially all of the disadvantageous features mentioned hereinbefore.

Another object of the present invention is to provide a new and improved elastomeric screening media of the type described that can be used directly on existing vibratory screen decks without the need for adjustment or alteration in the supporting frame thereof. Included in this object is the provision for a pretensioned, noncorrosive, highly flexible laminated screen panel having an elastomeric top wear surface and a backing or supporting member having the requisite dimensional stability necessary to avoid sagging, flapping, fatigue and bottom surface wear while providing high efficiency operation without plugging of near size material and the resultant blinding of the screening surface.

Still another feature of the present invention is to provide an abrasion resistant rubber or elastomeric screening panel having an integral fabric reinforced backing intimately bonded thereto throughout its full extent. Included in this object is the provision for a tough, semi-hard pretensioned and dimensionally stable backing well suited to a prolonged operational life and excellent sizing efficiency at relatively low cost.

A further object of the present invention is to provide a new and improved screening panel of the type described that is of light weight construction adapted for easy installation in confined areas.

Other objects will be in part obvious and in part pointed out in more detail hereinafter.

These and related objects are accomplished in accordance with the present invention by providing a new and improved abrasion resistant screening panel for use in vibratory screening operations comprised of a laminated sheet structure having a multiplicity of perforations extending entirely therethrough. The laminated structure consisting of a highly flexible, pretensioned high tensile strength backing sheet and a top facing sheet of relatively soft abrasion resistant, elastomeric material permanently bonded to and fully covering the pretensioned backing throughout its planar extent. The elastomeric layer provides a substantially planar top wear surface interrupted only by the perforations.

A better understanding of the objects, advantages, features, properties and relationships of the invention will be obtained from the following detailed description and accompanying drawing which set forth an illustrative embodiment indicative of the way in which the principles of the invention are employed.

BRIEF DESCRIPTION OF THE DRAWING

In the drawing:

FIG. 1 is a top view, partially broken away, of a portion of a screen deck utilizing the screening panel of the present invention;

FIG. 2 is a sectional view taken along the line 2—2 of FIG. 1; and

FIG. 3 is an enlarged sectional view of a portion of the screening panel shown in FIGS. 1 and 2.

DESCRIPTION OF A PREFERRED EMBODIMENT

Referring now to the drawing in greater detail wherein like reference numerals indicate like parts throughout the several figures, the invention is shown as embodied within a vibratory screen deck 10 mounted between a pair of upstanding vibrating screen side plate members 12 and a plurality of screen deck support rails or bars 14 disposed in spaced parallel relationship between the side plates for supporting a screen deck assembly 16. In the conventional screen deck, the supporting bars, frequently referred to as "bucker-up" bars, are spaced about 10 to 14 inches apart and it is an advantageous feature of the present invention that no change is required in the support bar arrangement in order to provide adequate support for the screen and prevent undesirably excessive sagging or fluttering. Heretofore, the use of all-rubber screen panels has necessitated an expensive adjustment in the location of these bars to provide a spacing of only about 9 inches or less in order to prevent such sagging and fluttering. However, even at a 9 inch spacing the all-rubber screens were found to exhibit undesirable sag and flutter during the vibratory screening operation. Unfortunately, this was accompanied by excessive wear on the bottom surface of the panels as a result of abrasive rubbing against the support bars.

The screen assembly 16 consists of a laminated screening panel 18 and a pair of elongated side rails or hooks 20 securely mounted along opposite sides of the panel. As shown in all three figures of the drawing the laminated panel 18 consists of an abrasion resistant elastomeric top layer 22 firmly bonded to a flexible, pretensioned and dimensionally stable, fabric reinforced elastomer backing 24 by suitable means such as an adhesive layer 26. Each rail or hook 20 is of generally V-shaped cross section having an included angle of about 60° between the legs 28, 30 thereof, with the leg 28 being of greater width and being secured to the underside of the screening panel 18. A plurality of spaced threaded bolts 32 extend through leg 28 of the side rail 20 and are threadably received by an elongated edge retaining plate 34 so as to retainably clamp the screening panel 18 between the retaining plate 34 and the hook 20. The screen assembly 16 consisting of the screening panel 18 and side rails 20, extends across the bucker-up bars 14 and is drawn tightly thereagainst by elongated U-shaped retainer clamps 38 fastened to the side wall members 12 of the frame by bolts 40. Both the side rails 20 and the retainer clamps 38 are sturdy metal members having a thickness of about three-sixteenths to one-fourth inch with the clamps 38 being shown in FIG. 2 as having an abrasion resistant elastomeric coating 42 bonded to the exposed top surface thereof. In the particular embodiment illustrated the screen assembly 16 is shown in a slightly curved transverse configuration such that the top wearing surface 44 of layer 22 is slightly convex as it is tightly drawn against bars 14 by the retainer clamps 38.

Depending on the width of the screen deck it may be advisable also to provide an intermediate clamping device such as the center hold-down bar 46 to secure the laminated screening panel to the supporting frame at or near the center line of the screen bed. In the particular embodiment illustrated, the center clamping bar 46 is a generally rectangular strip provided with a plurality of alternately off-set apertures for receiving the threaded ends 48 of a plurality of J-bolts 50 hooked beneath a central support rail or "bucker-up" bar 14. The J-bolts are tightly drawn into engagement with the supports by nuts 52 that bear against the hold-down bar 46 and securely clamp the screening panel. As mentioned, this center hold-down clamping bar is an optional feature used only in those instances where the screening media has a substantially transverse dimension, i.e., typically where the screen has a transverse dimension greater than about four feet.

Turning now particularly to FIG. 3 of the drawing, the laminated screening panel of the present invention is illustrated as consisting essentially of a multi-ply pretensioned, fabric reinforced elastomeric backing 24 having a layer 22 of abrasion resistant elastomeric material secured thereto by vulcanization or by means of a suitable adhesive 26. The backing material utilized in the preferred embodiment of the present invention is a multi-ply woven or nonwoven fabric that is pretensioned and impregnated with a suitable elastomeric material. The fabric may be composed of cotton, nylon, rayon, polyester, or similar materials and the continuous filaments of the fabric are preferably placed under tension during the impregnating operation so that the resultant product exhibits a high degree of dimensional stability and will not stretch appreciably under high load conditions. The pretensioned backing preferably should consist of at least two plys of woven or nonwoven fabric although in practice it is generally preferred to utilize at least three plys and preferably about 5–10 plys or more to provide the desired high tensile strength and sufficient bridge strength to prevent excessive sagging or deforming under the high load vibratory conditions of the screening operation. The pretensioned high tensile strength material exhibits a typical thickness of about one-eighth to three-eighths inch and may have a thickness of up to about one-half inch or more depending upon the specific application of the screening panel. As will be appreciated, a screen deck of the invention that is handling materials of substantial weight and size may require the use of thicker and stronger backing material.

As mentioned, the backing essentially consists of a multi-ply, pretensioned fabric impregnated with a suitable elastomer. It is generally preferred that the impregnant be a material that is compatible with the abrasion resistant top surface of the laminated screening panel. Accordingly, elastomers of natural or synthetic rubber may be used, such as isoprene, neoprene, butadiene-styrene, or similar rubber or plastic materials. Although many of these rubber-like materials may also be employed in the abrasion resistant coating, it is a feature of the present invention that the backing material exhibits substantially greater toughness and hardness than the relatively soft abrasion resistant top layer of the panel. Accordingly, the backing should exhibit a hardness on the durometer scale of about 70–90 Shore and substantially no elongation although an elongation of less than one percent may be tolerated for some applications.

The materials found particularly well suited as backings for the screening panel of the present invention are those elastomer impregnated fabrics commonly used in the belting industry for conveyors and the like. These materials exhibit virtually no stretch whatsoever yet are extremely flexible and provide completely waterproof characteristics. They will not absorb moisture and in fact inhibit absorption thereby preventing swelling and deterioration of the backing. Additionally, the waterproof characteristics of the material are retained even when the backing is perforated, punched or cut to provide the desired screen opening. Further they do not exhibit undesirable frayed edges in the newly exposed areas and can be provided with a smooth elastomer or friction bottom surface.

The strength characteristics of the preferred pretensioned conveyor belt materials also render this material well suited to its application in the instant invention. Generally it exhibits a tensile strength of at least 500 pounds per inch up to about 1500 pounds per inch with a working tensile strength of about 15 pounds per inch of width per ply. Accordingly, a five ply material will exhibit a working tensile strength of about 75 pounds per inch of width while a nine ply material will exhibit a working tensile strength of about 135 pounds per inch of width. It will of course be appreciated that the working tensile strength of the material is only a fraction of the ultimate strength of the backing and in fact amounts to only about 12–15 percent of the ultimate strength of the backing material.

As mentioned, the wear resistant elastomeric layer 22 is firmly secured to the top surface of the backing. This soft, abrasion resistant layer may be a natural or synthetic elastomeric composition exhibiting a durometer hardness value of about 30–60 Shore "A." The elastomeric material in this layer is relatively soft, resilient and elongatable as compared to the backing layer, and is firmly bonded or secured thereto throughout its full extent by a suitable bonding system. This bonding may be accomplished by vulcanization or by the use of a bonding agent or adhesive as illustrated in FIG. 3. Where an adhesive material is employed it preferably should be a material that is compatible with both the impregnated fabric backing and the elastomeric abrasion-resistant top surface. Accordingly, a rubber such as a, neoprene or urethane based adhesive is generally preferred.

The abrasion resistant top layer may be composed of natural or synthetic elastomeric material such as natural rubber, e.g., cis-polyisoprene of trans-polyisoprene as well as synthetic elastomers such as polychloroprene (neoprene), butadiene-styrene or butadiene-acrylonitrile copolymers or isobutyl or polyurethane rubbers. However, the preferred elastomer is a material commercially available under the registered trademark "Linatex." This material is manufactured directly from a rubber latex composition and exhibits outstanding properties of abrasion resistance. As will be appreciated, other elastomeric materials exhibiting similar wear resistant characteristics may be utilized.

In certain cases where conditions warrant, such as the screening of highly abrasive materials, a thin layer of soft elastomer may also be applied to all or part of the underside of the pretensioned, fabric reinforced backing materials to prevent localized abrasion of the backing at the support members.

The screening panel of the present invention is readily formed by merely punching or cutting appropriately sized apertures 54 at the correct locations in the laminated sheet structure. These perforations may take any desired shape including round, square, slotted or the like and are usually so arranged on either a staggered or straight row pattern that a significant percentage of the tensioned fabric strands remain uncut and therefore run continuously between the side rails clamped to the edges of the panel. This not only assists in retaining the dimensional stability of the screen panel, but also produces a flexible panel that can be drawn extremely taut over the support or bucker-up bars of conventional vibrating screen frames. The apertures 54 are illustrated as being substantially uniform throughout the depth of the panel. However, the size of the aperture in the backing layer is preferably equal to or larger than the overlying opening in the abrasion resistant layer.

As will be apparent to persons skilled in the art, various modifications, adaptations and variations of the foregoing specific disclosure can be made without departing from the teachings of the present invention.

I claim:

1. A laminated flexible screen panel well suited for use in a vibratory screening operation consisting essentially of a substantially planar laminated sheet structure having an array of screen openings extending therethrough, said laminated structure being comprised of a pretensioned fabric reinforced flexible, nonmetallic backing layer and an abrasion resistant, elastomeric facing layer relatively soft with respect to said backing layer superimposed on and permanently bonded to the backing layer throughout its planar extent, the size of the openings in the backing layer being at least equal to the size of the openings in the facing layer in registry therewith, said elastomeric layer having a substantially planar top wear surface, said backing layer being comprised of a high tensile strength, pretensioned nonextensible material and having sufficient dimensional stability to resist extensive sagging and fluttering across its unsupported transverse extent when subjected to vibratory screening action.

2. The screening panel of claim 1 wherein the backing layer is provided with at least two plies of a fabric embedded therein in a pretensioned condition.

3. The screening panel of claim 1 wherein the backing layer exhibits less than one percent elongation and consists of an elastomer impregnated multi-ply fabric.

4. The screening panel of claim 1 wherein the backing layer is a multi-ply elastomer impregnated belting material and the top layer is an elastomeric sheet having a thickness at least equal to that of the backing layer.

5. The screening panel of claim 1 wherein the backing layer is a multi-ply, pretensioned elastomer impregnated fabric and the screen openings are arranged in a pattern of rows so that the fabric strands between the rows are uncut and run continuously across the panel.

6. The screening panel of claim 1 wherein the backing layer is a multi-ply pretensioned, elastomer impregnated fabric of at least five ply construction having a working tensile strength of about fifteen pounds per inch of width per ply.

7. The screening panel of claim 1 wherein the abrasion resistant upper elastomeric layer and the backing layer are bonded with an adhesive.

8. The screening panel of claim 1 wherein the abrasion resistant upper layer and the backing layer are vulcanized together.

* * * * *